United States Patent [19]

Baumann et al.

[11] Patent Number: 4,906,365
[45] Date of Patent: Mar. 6, 1990

[54] FILTER FOR CLEANING LUBRICATING OIL

[75] Inventors: Dieter Baumann, Greven-Gimbte; Norbert Prinz, Greven, both of Fed. Rep. of Germany

[73] Assignee: Ing. Walter Hengst GmbH & Co. KG., Muenster, Fed. Rep. of Germany

[21] Appl. No.: 265,578

[22] Filed: Nov. 1, 1988

[30] Foreign Application Priority Data

Nov. 4, 1987 [DE] Fed. Rep. of Germany ... 8714656[U]

[51] Int. Cl.<sup>4</sup> ............................................. B01D 27/08
[52] U.S. Cl. ..................... 210/238; 210/248; 210/443; 210/453; 210/454; 123/196 A; 184/6.24; 137/549
[58] Field of Search ...................... 210/431, 433.1, 435, 210/437, 443, 453, 454, 238, 248, 422, 432; 137/549; 123/196 A; 184/6.24

[56] References Cited

FOREIGN PATENT DOCUMENTS

3409219A1  9/1985  Fed. Rep. of Germany ...... 210/443
3538589A1  5/1987  Fed. Rep. of Germany .
2162079A   1/1986  United Kingdom ................ 210/443

Primary Examiner—Richard V. Fisher
Assistant Examiner—Matthew O. Savage
Attorney, Agent, or Firm—Felfe & Lynch

[57] ABSTRACT

The invention relates to a filter for cleaning lubricating oil, especially for internal combustion engines of motor vehicles, with a filter case which, when installed, is in an at least approximately upright position. It has a cylinder-shaped oil filter cartridge and an inlet for the dirty oil flowing through the filter cartridge, plus an outlet for clean oil connected to the central interior part of the filter case and situated in a base at the bottom end of the filter case. A drain passage at the bottom end of the filter case becomes connected to the inlet chamber of the filter case whenever the filter cartridge is removed, plus a closure which cuts the drain passage off from the filter case. The filter in accordance with the invention is distinguished by the fact that the closure is a valve body which is axially displaceable in the drain passage and which forms a valve together with at least one constriction in the drain passage, that the valve body is prebiased in the opening direction by a first, weaker spring, and that the valve body can be biased in the closing direction by a second, stronger spring which, when the filter cartridge is inserted into the filter case, thrusts against its end facing the valve body.

8 Claims, 2 Drawing Sheets

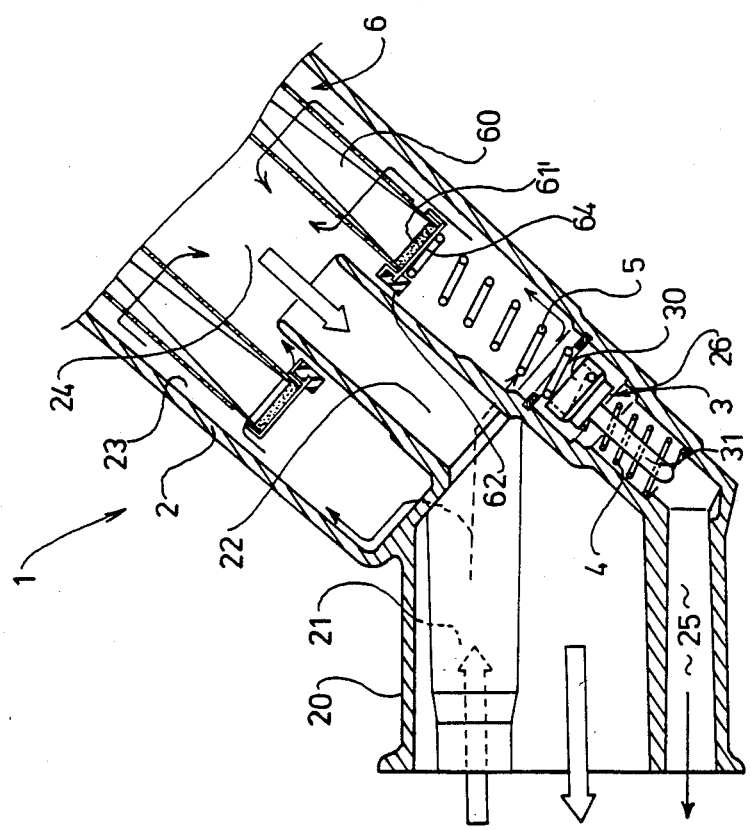

FILTER FOR CLEANING LUBRICATING OIL

BACKGROUND OF THE INVENTION

The invention relates to a filter for cleaning lubricating oil, especially for internal combustion engines of motor vehicles, having a filter case disposed in an at least approximately upright position when installed, and having also a cylinder-shaped oil filter cartridge inserted therein. The filter has also an oil inlet for the contaminated oil flowing around the cartridge and an oil outlet provided in a base at the bottom end of the filter case for filtered oil, this clean oil outlet being connected to the internal central part of the filter case. The filter also has a drain at the bottom end of the filter case; the drain can be connected to the inlet chamber of the filter case by removing the oil filter cartridge, and has a closure which shuts the drain off from the filter case.

An oil filter of the kind just described is disclosed in DE-OS No. 35 38 589. In this filter the closure is an annular, elastic sealing lip disposed externally on the bottom end of the filter cartridge when the latter is in the installed state; the sealing lip sealingly engages the inside wall of the filter case and is pointed in the normal oil flow direction in the manner of a circumferential check valve. When the filter cartridge is removed from the case the sealing lip arrives at an especially shaped area of the case wall, thereby opening the drain for the purpose of emptying the filter case before the cartridge is completely removed from the case. This oil filter does not have any functional disadvantage, but in practical application it has been found that the sealing lip represents a relatively large percentage of the cost of the filter, or, more precisely, of the filter cartridge. This is because the cost of manufacture is substantially higher in comparison to a simple sealing ring, and a high-quality material has to be used in order to assure the necessary resistance to heat. Furthermore, the sealing lip has to be provided new for each cartridge since both the lip and the cartridge are discarded after use.

The problem therefore presents itself of creating an oil filter of the kind described above, which will not have the disadvantage described, and which can be made at much lower cost.

SUMMARY OF THE INVENTION

The solution of this problem is accomplished in accordance with the invention by an oil filter of the kind described above, which is characterized in that the closure is a valve body which is axially displaceable in the drain, and which together with at least one constriction of the drain passage forms a valve; that the valve body is biased in the opening direction by a first, weaker spring, and that the valve can be biased in the closing direction by a second, stronger spring, and this spring thrusts against the filter cartridge at its end facing the valve body when the cartridge is inserted into the filter case.

By this arrangement of the valve body and the two springs, the operation of the new oil filter will be the same as in the oil filter of the state of the art, and at the same time a considerable cost saving will result. This is because, on the one hand, the material and manufacturing costs of the valve body and the two springs are decidedly lower than those of an elastic sealing lip, and on the other hand the closure, consisting of the filter body and the two springs, is now a part of the filter case, and no longer part of the throw-away filter cartridge.

To assure the desired function of the closure, namely of closing the drain when the filter cartridge is inserted and releasing it when the filter cartridge is removed, provision is made for the filter case to have a cover which can be screwed or snapped or clamped onto it, whose inside surface will engage the filter cartridge inserted in the case while exerting a force in the axial direction against its extremity adjacent the cover. As a result no special means for locking the filter cartridge are necessary.

Provision is furthermore made for the cover and the filter cartridge to be joined together. With this embodiment, when the cover is loosened, e.g., by unscrewing, the filter cartridge will move in synchronism with it, and when the cover comes away from the case the cartridge will be pulled slightly out of the case. This will open the drain early and the oil in the filter case will have enough time to flow out of the case through the drain, e.g. into a motor oil drain pan.

A preferred manner of joining the cover and the filter cartridge is snap-fastening. For this purpose provision is advantageously made for the cover to have on its inside a plurality of spring tongues provided with catch projections and extending into the interior of the filter, and for the filter cartridge to have on its cover end a circumferential internal groove or a plurality of depressions arranged in a circle to engage the catch projections. The depression in the filter cartridge is preferably a circumferential groove within a recess in the end of the cartridge. By these means an easy-to-release fastening between cover and cartridge is created, by which axial forces can be exerted on the cartridge in both directions to a sufficient degree. At the same time the changing of the filter cartridge becomes easier and can be performed with less chance of soiling the hands. Furthermore, the cover is thus reusable.

Other possibilities for joining the cover and filter cartridge are to cement them together or to cast directly in the interior of the cover a casting composition to accommodate and hold the end of the filter material body of the filter cartridge. These methods of joining are especially simple and inexpensive but they virtually exclude any reuse of the cover.

BRIEF DESCRIPTION OF THE DRAWINGS

A preferred embodiment of the invention will now be explained with the aid of a drawing, wherein:

FIG. 2 is, again, a longitudinal section of the oil filter of FIG. 1 with the filter cartridge partially withdrawn.

DESCRIPTION OF PREFERRED EMBODIMENT

Figure 1:
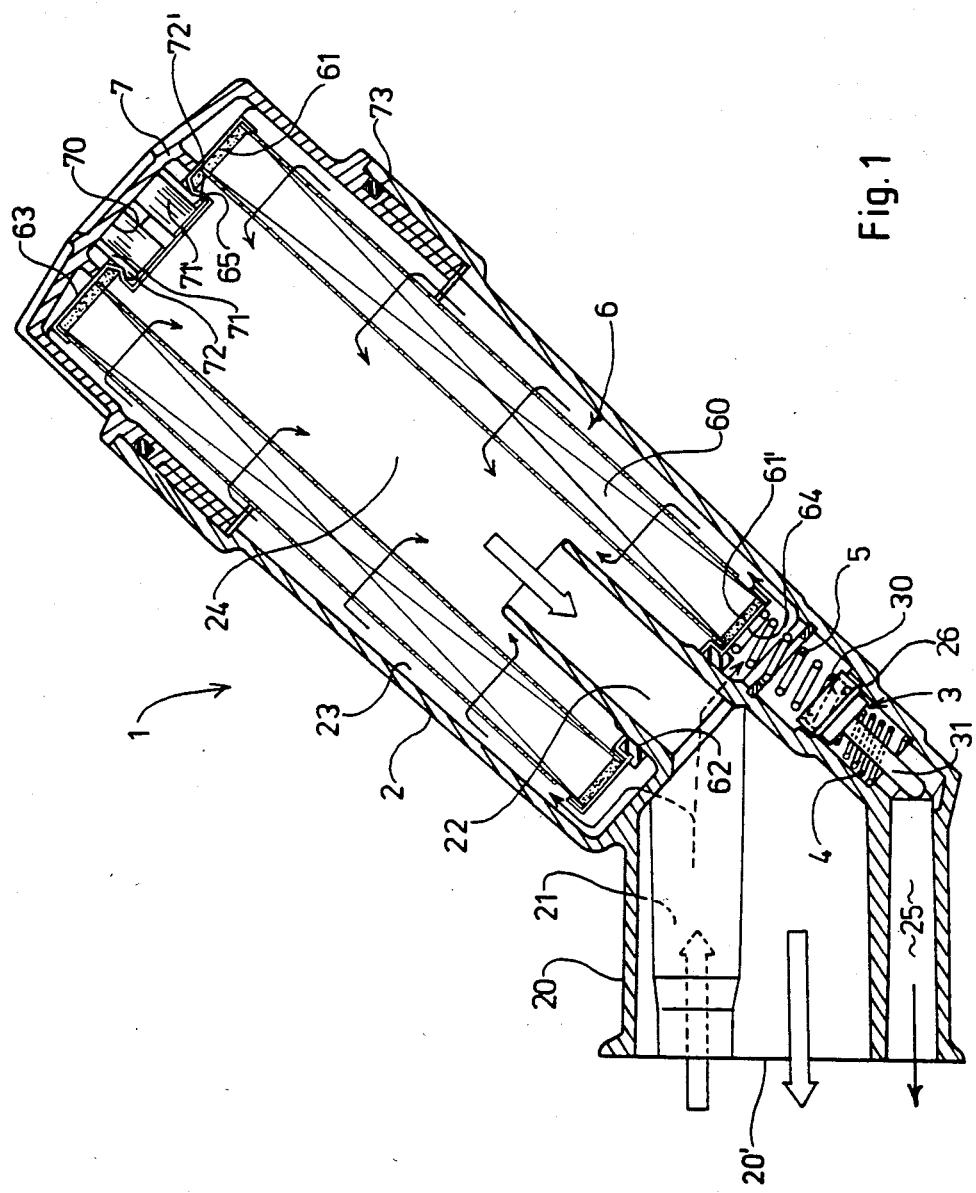
FIG. 1 is a longitudinal section of an oil filter with cartridge inserted, partially in elevation.

In FIG. 1, the embodiment of the oil filter 1 consists essentially of a filter case 2 with base 20, a replaceable oil filter cartridge 6 inserted into the case 2, and a screw cover 7 terminating the upper end of the case. The longitudinal axis of the filter case 2 slants upwardly, so that the filter case 2 assumes an approximately upright position. The base 20 of the filter case 2 is angled away from the longitudinal axis of the case 2 and terminates in a substantially vertical flange 20' which serves for attaching the oil filter 1 to an internal combustion engine, not shown, of a motor vehicle. As indicated by the flow arrows, the base 20 serves to carry oil in and out of the filter. Dirty oil passes through an oil inlet 21 in the upper, rear part of the base 20 into an inlet chamber 23 surrounding the filter cartridge 6 where it distributes itself over the circumference of the cartridge 6. After flowing through the filter cartridge 6, or more precisely through its body of filter material 60, the now-clean oil collects in the interior 24 of the filter 1 and flows from there, as indicated by the arrows, through a central oil outlet 22 and the base 20. The inlet chamber 23 and the inner area 24 of the oil filter 1 are separated from one another by a sealing ring 62, preferably of rubber, placed at the bottom end 64 of the filter cartridge 6, and by the cover 7 at the upper end 63 of the cartridge 6.

In the bottom part of the base 20 is a drain passage 25 which serves to drain the oil in the case 2 of the oil filter 1 when the filter cartridge 6 is replaced. But, in the normal operation of the oil filter 1, i.e., when the filter cartridge 6 is in place, the drain passage 25 must be closed. For this purpose a valve body 3 is inserted into the drain passage 25 below the filter cartridge 6 and together with the constriction 26 of the passage 25 forms a valve. The valve body 3 is of a rotationally symmetrical configuration and has a broader head 30 facing the filter cartridge 6, and a thinner guide end 31 extending from the head downwardly into the passage 25. In the working state of the oil filter 1 represented in FIG. 1, i.e., with the filter cartridge 6 inserted and the lid 7 tightly screwed on, the valve body 3 is pressed to its closed position by means of a coil spring 5 disposed between the head 30 of the valve body 3 and the bottom end surface 64 of the filter cartridge 6.

Under the head 30 of the valve body 3 can be seen another spring 4, here a tapered coil spring, which is made weaker than the previously described spring 5. Spring 4 biases the valve body 3 in its opening direction, but in the state of the oil filter 1 in FIG. 1, the force produced by spring 4 is less than the force exerted by spring 5 on the valve body 3, so that the valve body assumes its closed position.

As the filter cartridge 6 is withdrawn from the case 2 of the oil filter 1, the upper, stronger spring 5 is relieved, so that the force exerted by this spring 5 on the valve body 3 is gradually reduced and finally eliminated. This enables the lower spring 4 to move the valve body 3 to its open position. This state of the oil filter 1 is represented in FIG. 2 of the drawing. As it can be seen in FIG. 2, the filter cartridge is pushed upward by a certain amount relative to the filter case 2. The sealing ring 62 is now free, so that the inlet chamber 23 and the interior chamber 24 of the filter case are in communication with one another. Due to the upward displacement in the drain passage 25 of valve body 3, produced by spring 4, the drain passage 25 is now open and permits oil to flow down from the interior of the filter case 2, both from inlet chamber 23 and from the interior chamber 24. As a result, when the filter cartridge 6 is replaced, it is accompanied by only a very small amount of oil, appreciably reducing the danger of environmental pollution by the oil.

To assure the proper operation of the valve body 3 it is necessary for the filter cartridge 6 to exert an axial force on the spring 5. In order to secure the cartridge in the position in which it is shown in FIG. 1, the cover 7 of the filter case 2 is constructed so that it contacts the end 63 of the filter cartridge and exerts an axial thrust against it. Furthermore, in the embodiment of the oil filter in FIG. 1, the filter cartridge 6 and the cover 7 are releasably joined together. For this purpose the cover 7 has on its inside 70 a plurality of spring tongues 71 and 71', of which two are visible in FIG. 1. The spring tongues 71 and 71' are disposed on a circle concentric with the longitudinal axis of the filter case 2 and project from the inside 70 of the cover into the interior of the filter case 2. At their inner end the spring tongues 71 and 71' have outwardly protruding catch projections 72 and 72' which, when the filter cartridge 6 is inserted into the case 2, engage in a matching indentation 65 in the upper end 63 of the filter cartridge. As a result, axial forces can be applied to the filter cartridge 6 by the cover in both directions. The cover 7 is joined to the filter case 2 in the embodiment of the oil filter 1 that is here represented, by screwing.

Finally, FIG. 1 also shows bodies 61 and 61' of a casting composition, created in the top and bottom ends 63 and 64 of the filter cartridge 6, into which the body of the filter material is embedded at its extremeties.

We claim:

1. Oil filter for the cleaning of lubricating oil, comprising: a filter case which in the installed state is disposed at least approximately upright, an annular oil filter cartridge inserted in the case, the filter case including an oil inlet leading to an inlet chamber for flowing contaminated oil around the oil filter cartridge and including an oil outlet for clean oil connected to an interior chamber of the filter case which is an interior portion of the oil filter cartridge, the oil inlet and outlet being in a base at the bottom end of the filter case, the filter case including a drain passage at the bottom end of the filter case, and which is isolated from the oil outlet and which, by removal of the oil filter cartridge, is connectable to the inlet chamber of the filter case, and the drain passage having an axial direction and having a closure which closes the drain passage off from the filter case, the closure being a valve body having a head portion and being displaceable in the axial direction in the drain passage, the drain passage having at least one constriction which forms a valve together with the head portion of the valve body for directly controlling the drain passage, a first weaker spring located on one side of the head portion for biasing the valve body in an opening direction, and a second, stronger spring located between an end face of the oil filter cartridge and the opposite side of the head portion for biasing the valve body in a closing direction, the second, stronger spring thrusting, when the filter cartridge having an end face facing the valve body is inserted into the filter case, against and directly contacting the end face of the oil filter cartridge facing the valve body.

2. Oil filter in accordance with claim 1, in which the cartridge has a cover-facing end and in which the filter case has a cover which can be attached to the case, and in which the cover has an inside surface directly contacting and engaging the filter cartridge while exerting a force acting in the axial direction on a cover-facing end of the cartridge inserted into the case.

3. Oil filter in accordance with claim 2, which includes means for joining together the cover and the filter cartridge.

4. Oil filter in accordance with claim 2, which includes means for snap-fastening the cover and the filter cartridge together.

5. Oil filter in accordance with claim 4, in which the snap fastening means comprises several spring tongues located on the inside of the cover having outwardly protruding catch projections arranged in a circle and projecting into a circular catch indentation located in the interior portion of the oil filter cartridge.

6. Oil filter in accordance with claim 5, in which the catch indentation in the filter cartridge is a circular recess in the end face of the cartridge.

7. Oil filter in accordance with claim 2, in which the cover and the filter cartridge are cemented together.

8. Oil filter in accordance with claim 2, which includes a casting composition body receiving and holding the end of the filter cartridge, the casting composition body being cast directly in the interior of the cover.

* * * * *